(12) United States Patent
Ishwar et al.

(10) Patent No.: US 7,466,698 B2
(45) Date of Patent: Dec. 16, 2008

(54) NETWORK NODE WITH LAYER 3 INTERFACES CONFIGURABLE BY INTERFACE CLASS

(75) Inventors: Prashanth Ishwar, Santa Clara, CA (US); Apurva Mehta, Cupertino, CA (US); Shiva Shenoy, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 980 days.

(21) Appl. No.: 10/454,283

(22) Filed: Jun. 4, 2003

(65) Prior Publication Data

US 2003/0223378 A1 Dec. 4, 2003

Related U.S. Application Data

(60) Provisional application No. 60/385,866, filed on Jun. 4, 2002.

(51) Int. Cl.
*H04L 12/28* (2006.01)
(52) U.S. Cl. ..................................................... 370/389
(58) Field of Classification Search ................. 370/254, 370/242, 252, 389
See application file for complete search history.

(56) References Cited

U.S. PATENT DOCUMENTS 5,748,905 A * 5/1998 Hauser et al. ............... 709/249

2003/0123448 A1 * 7/2003 Chang ...................... 370/395.1
2003/0172147 A1 * 9/2003 Chang et al. ................ 709/223
2003/0223378 A1 * 12/2003 Ishwar et al. ................ 370/254

OTHER PUBLICATIONS

Brian Hill, "Cisco: The Complete Reference", 2002 (received by Library of Congress in Mar. 22, 2002), p. 325-327, 657-663, 668-670, 700, 1040, 1042, 1048.*
Brian Hill, "Cisco: The Complete Reference", 2002 (received by Library of Congress in Mar. 22, 2002), p. 611.*

* cited by examiner

*Primary Examiner*—Kevin C. Harper
*Assistant Examiner*—Jianye Wu (57) ABSTRACT

A concept of "Interface Class" is introduced. All logical interfaces that belong to an Interface Class are indistinguishable in hardware. Each Interface Class is associated with one or more packet forwarding rules, such as Access Control Lists (ACLs), Policy Routes, and Quality of Service (QoS). Each Interface Class is also assigned with a Class ID, which is a user-defined integer. When defined in terms of a Class ID, a logical interface (e.g., an L3 Interface) will inherit all the packet forwarding rules associated with the Class ID. In one embodiment, Class IDs and Interface IDs can be stored in the same hardware lookup table in association with data representative of their respective packet forwarding rules.

14 Claims, 5 Drawing Sheets

FIG. 1

```
                                                  ┌─ 212
interface-class maximum 128
!
access-list 102 permit 192.15.64.0 0.0.0.255     ⎫
access-list 102 permit 145.188.0.0 0.0.255.255   ⎬ 214
access-list 102 permit 16.0.0.0 0.255.255.255    ⎭
!
interface-class 52                               ⎫
     ip access-group 102 out                     ⎬ 202
     ip policy route-map Houston-MCI             ⎭
!
!
interface ethernet 2/1/0                         ⎫
     class-id 52                                 ⎬ 204
     ip address 165.122.128.12 255.255.0.0       ⎭
!
!
interface gigabitethernet 1/0/1                  ⎫
     class-id 52                                 ⎬ 206
     ip address 192.16.5.29 255.255.255.0        ⎭
!
!
interface ethernet 2/1/2
     class-id 12
     ip address 155.122.128.1 255.255.0.0
!
!
interface ethernet 2/1/3                         ⎫
     ip address 192.15.4.22 255.255.0.0          ⎪
     ip access-group 102 out                     ⎬ 210
     ip policy route-map Houston-MCI             ⎭
```

Fig. 2

| Class ID / Interface ID | Applicable Rules |
|---|---|
| 0 | Reserved |
| 1 | ... |
| . | ... |
| . | ... |
| 52 | R1, R2 |
| . | ... |
| . | ... |
| 3829 | R1, R2 |
| . | ... |
| . | ... |
| 4095 | Reserved |

Fig. 3

| VLAN ID | Class ID / interface ID |
|---|---|
| ... | ... |
| 6512 | 52 |
| ... | ... |
| 9216 | 52 |
| 9215 | 3829 |
| ... | ... |
| ... | ... |
| 2531 | 12 |
| ... | ... |
| ... | ... |
| 9348 | 0 |
| ... | ... |

| VLAN | Class ID / Interface ID |
|---|---|
| ... | ... |
| VLAN A | 47 |
| ... | ... |
| VLAN B | 106 |
| ... | ... |
| VLAN C | 3829 |

602

| Class ID / Interface ID | Applicable Rules |
|---|---|
| ... | ... |
| 47 | R1, R2 |
| ... | ... |
| 106 | R1, R2 |
| ... | ... |
| 3829 | R1, R2 |

| VLAN | Class ID / Interface ID |
|---|---|
| ... | ... |
| VLAN X | 52 |
| ... | ... |
| VLAN Y | 52 |
| ... | ... |
| VLAN Z | 52 |

612

| Class ID / Interface ID | Applicable Rules |
|---|---|
| ... | ... |
| 52 | R1, R2 |
| ... | ... |
| ... | ... |
| ... | ... |

NETWORK NODE WITH LAYER 3 INTERFACES CONFIGURABLE BY INTERFACE CLASS

CROSS-REFERENCE TO RELATED APPLICATION

This application is entitled to the benefit of provisional U.S. Patent Application Ser. No. 60/385,866, filed Jun. 4, 2002, which is incorporated herein by reference.

FIELD OF THE INVENTION

The invention relates generally to the field of networking and more specifically to a method and apparatus for configuring interfaces of a network node.

BACKGROUND OF THE INVENTION

In switch/routers, interface identifiers (interface IDs) are used for identifying Layer 3 (L3) Interfaces. In typical switch/routers, the maximum number of interface IDs that have hardware support is fixed due to hardware limitations. For instance, in some switch/routers, the interface IDs are limited to 12-bits in length. Therefore, in those switch/routers, there can only be 4096 unique interface IDs. That is, in those switch/routers, the maximum number of Layer 3 Interfaces that can be supported by hardware is 4096.

The number of L3 Interfaces that would benefit from hardware support may far exceed 4096. Yet, the number of interface IDs that the switch/router can store remains limited due to the high cost of memory, such as Content Addressable Memories (CAMs) that are used for storing such identifiers.

In view of the foregoing, there exists a need for a switch/router where the number of hardware-supported logical interfaces can exceed the number of available interface identifiers.

SUMMARY OF THE INVENTION

The invention introduces the concept of "Interface Class." Interfaces that belong to an Interface Class are indistinguishable in hardware. Each Interface Class is associated with one or more packet forwarding rules that define network services, such as Access Control Lists (ACLs), Policy Routes, and Quality of Service (QoS). Each Interface Class is also assigned a Class ID, which is a user-defined integer. When defined using a Class ID, a logical interface (e.g., an L3 Interface) will inherit all of the packet forwarding rules associated with the Class ID. The packet forwarding rules of the Interface Class are applicable to the logical interface. In one embodiment, Class IDs and Interface IDs can be stored in the same hardware lookup table in association with data representative of their respective packet forwarding rules.

According to one embodiment, one or more interface classes are defined in terms of a Class ID and a set of packet forwarding rules. An interface can then be configured by associating the interface with an applicable Class ID as well as other interface-specific attributes, such as IP addresses. An interface can also be configured without a Class ID. In an embodiment, an interface that is configured without a Class ID belongs to a default class and will be assigned an Interface ID by the network node. In operation, when a packet arrives, a lookup is performed to determine the Class ID that is associated with the packet. Another lookup is then performed using the Class ID to retrieve packet forwarding rules that are pertinent to packet. The use of one lookup result in a subsequent lookup is often referred to as a "cascaded" lookup.

The use of interface classes enables the same set of packet forwarding rules to be associated with different interfaces while consuming only a single interface ID value from the limited ID space. Associating the same interface class with multiple interfaces has an aggregation effect that expands the number of interfaces that can be accommodated in a cascaded lookup. As a result, even if the number of Class IDs and Interface IDs is limited, the network node can support a significantly larger number of logical interfaces.

Other aspects and advantages of the present invention will become apparent from the following detailed description, taken in conjunction with the accompanying drawings, illustrating by way of example the principles of the invention.

BRIEF DESCRIPTION OF THE FIGURES

Throughout the description, similar reference numbers may be used to identify similar elements.

DETAILED DESCRIPTION

Embodiments of the invention can be implemented within a network node that handles traffic in discrete units, often referred to as datagrams, data packets or packets. In one embodiment, the network node can be an Ethernet switch/router that forwards traffic using OSI (Open Systems Interconnect) Layer 2, Layer 3, and/or Layer 4 header information. The network node may have a distributed architecture. That is, the network node may include line cards that are coupled to each other via a switch matrix and each line card is partially responsible for processing and forwarding the datagrams. Furthermore, the network node supports network protocols such as Ethernet, ATM, and Frame Relay. Although embodiments of the invention can be implemented within an Ethernet-based switch/router with a distributed architecture, the invention can be implemented within network nodes with other types of architecture as well.

Figure 1:
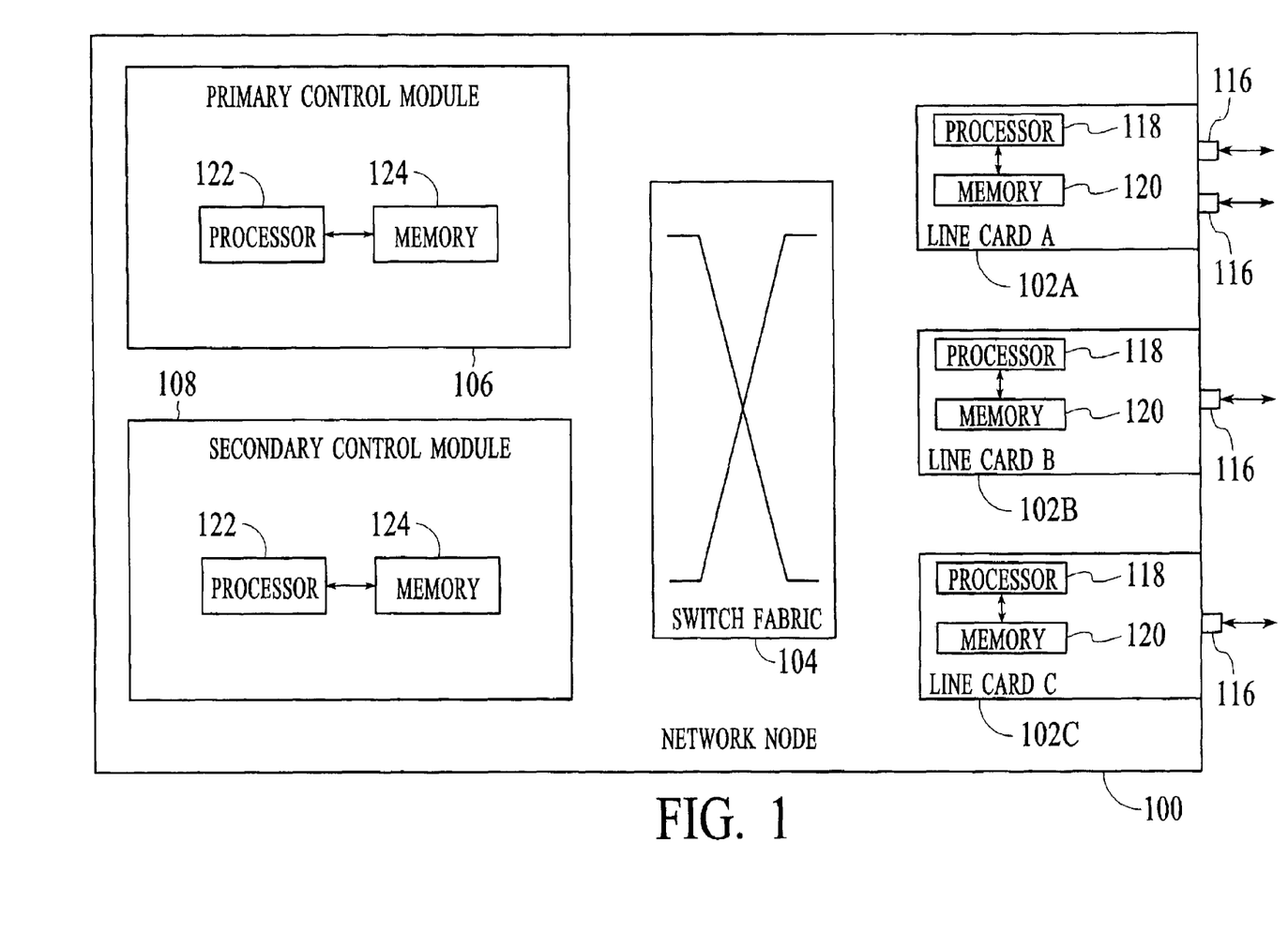
FIG. 1 depicts an example a network node in which embodiments of the invention can be implemented.

FIG. 1 depicts an example a network node 100 in which embodiments of the invention can be implemented. The example network node includes a primary control module 106, a secondary control module 108, a switch fabric 104, and three line cards 102A, 102B, and 102C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The network node may include line cards that support network protocols such as Ethernet, ATM, and Frame Relay.

Each of the line cards includes at least one port 116, a processor 118, and memory 120, which perform functions such as receiving traffic into the network node, buffering traffic, storing instances of a routing table, making forwarding decisions, and transmitting traffic from the network node. The processor within each line card may include a multifunction processor and/or an application specific processor that is operationally connected to the memory. The processor performs functions such as packet parsing, packet classification, and making forwarding decisions. The memory within each line card may include circuits for storing operational code, for buffering traffic, for storing an instance of an FIB, and for storing other data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include configuration state information and traffic forwarding information (i.e., the FIB). Forwarding information may also be stored in content addressable memory (CAM) or a combination of CAM and RAM. Although the processor and memory are depicted as separate functional units, in some instances, the processor and memory are integrated onto the same device. In addition, there may be more than one discrete processor unit and more than one memory unit on the line cards.

The switch fabric 104 provides datapaths between input ports and output ports and may include, for example, shared memory, shared bus, and crosspoint matrices. Although not depicted, the network node 100 may be equipped with redundant switch fabrics.

The primary and secondary control modules 106 and 108 support various functions, such as network management functions and protocol implementation functions. Example network management functions that are performed by the control modules include providing an interface configuration mechanism, providing timing control, updating Forwarding Information Bases, programming hardware tables, providing system information, managing hardware changes, bus management, and protocol processing. The interface configuration mechanism, in one embodiment of the invention, is a Command Line Interface (CLI) that is operable to receive user commands.

Each of the control modules 106 and 108 includes a processor 122 and memory 124 for carrying out the designated functions. The processor within each control module may include a multifunction microprocessor and/or an application specific processor that is operationally connected to the memory. The memory may include EEPROM or flash ROM for storing operational code and DRAM for buffering traffic and storing data structures. Although the processor and memory are depicted as separate functional units, in some instances, the processor and memory are integrated onto the same device. In addition, there may be more than one discrete processor unit and more than one memory unit on the line cards.

A main function of the network node 100 is to relay datagrams, or packets, from one data link to another. To do that, the characteristics of the interfaces through which the packets are received and sent must be defined. Interface characteristics include, but are not limited to, IP address, a port identifier, data encapsulation method, and media type. These interface characteristics are typically configured during a system setup process or an interface configuration process.

"Interface" is a Layer 3 concept. In the present description, an "interface" can refer to a physical port or to a logical interface. Logical interfaces are sometimes called virtual interfaces or subinterfaces. A subinterface is a mechanism that allows a single physical interface to support multiple logical interfaces or networks. That is, several logical interfaces or networks can be associated with a single hardware interface. Configuring multiple logical interfaces on a single physical interface allows greater flexibility, scalability and connectivity of the network node.

Regardless of whether an interface is physical or logical, each interface of the network node 100 is typically configured with one or more IP addresses and IP subnet masks. In addition, many network services, such as Quality of Service guarantees (QoS), Access Control List (ACL), and Policy Routing, can be enabled on a "per-interface" basis. Network services that are enabled on a "per-interface" basis apply to individual interfaces.

The invention introduces the concept of "Interface Class." According to an embodiment of the invention, an Interface Class refers to a group of interfaces that share certain attributes. All logical interfaces that belong to an Interface Class are indistinguishable in hardware and share the same network services. Network services, such as QoS, ACL, and Policy Routing, can be enabled on a "per-interface-class" basis. In contrast to network services that are enabled on a "per interface" basis, network services that are enabled on a "per-interface-class" basis can be applied to multiple interfaces that are associated with the same Interface Class. In other words, network services (or packet forwarding rules that define the network services) that are applicable to an Interface Class are applicable to all interfaces that are associated with or identified as belonging to that Interface Class.

Figure 2:
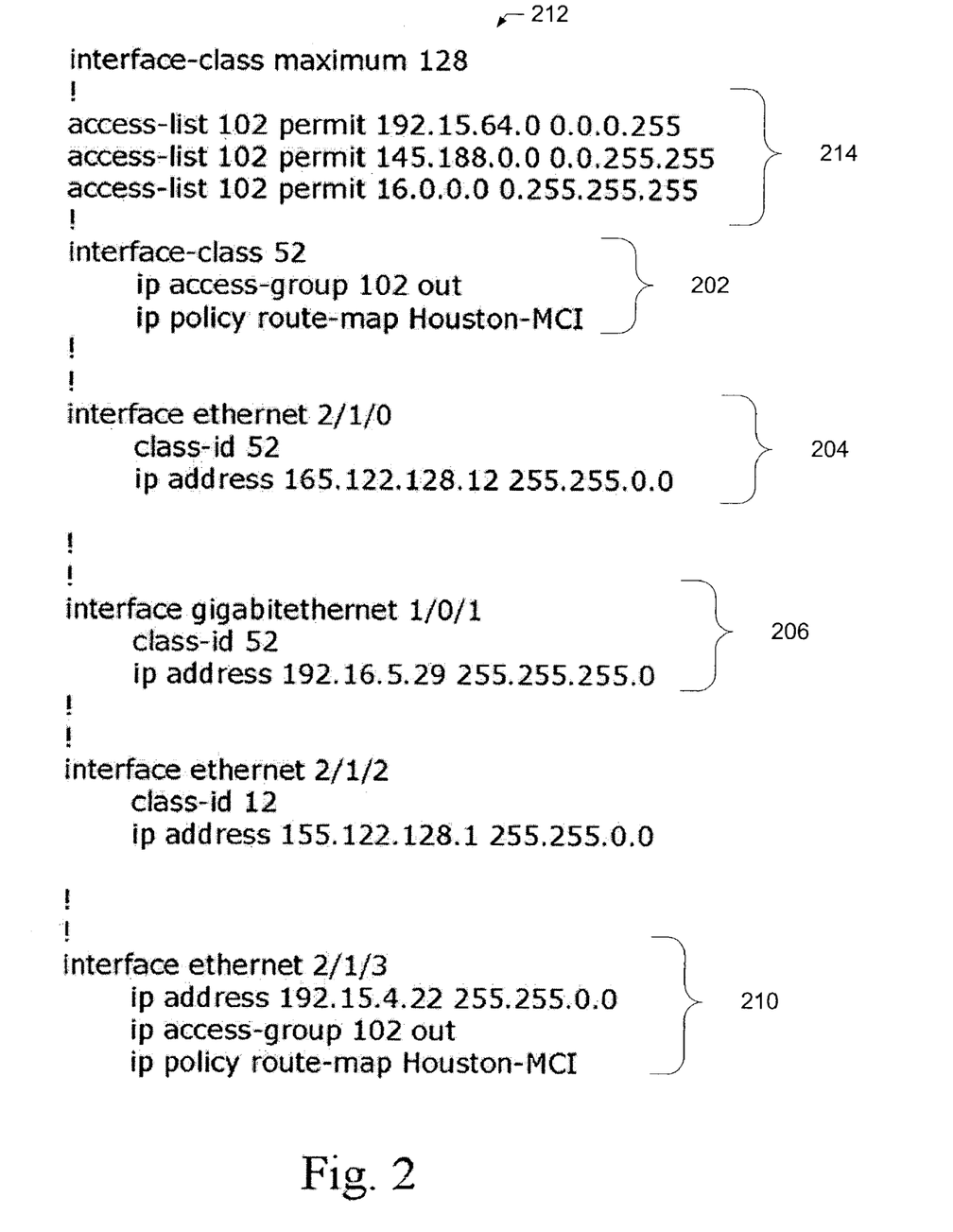
FIG. 2 depicts a number of interface configuration commands according to an embodiment of the invention.

Referring now to FIG. 2, there is shown a number of interface configuration commands according to an embodiment of the invention. In one embodiment, these interface configuration commands are input by a user/administrator through an interface configuration mechanism (e.g., Command Line Interface) of the network node. It should be understood that these interface configuration commands are shown as examples only and that the syntax of such commands shown may be implementation specific. In other implementations, the syntax of such commands may vary. Nonetheless, the principles of the invention can be equally applied.

The interface configuration commands of FIG. 2 include commands for configuring an Interface Class. In the illustrated examples, class configuration commands configure an Interface Class in terms of a Class ID and packet forwarding rules, which define network services such as ACL, QoS, and policy routing. One particular example of a class configuration command is command 202, which specifies a Class ID 52 and two packet forwarding rules ("ip access-group 102 out" and "ip policy route-map Houston-MCI"). The first rule "ip access-group 102 out" restricts packets that are associated with the access group "102", which is defined by access-list configuration commands 214. The second rule "ip policy route-map Houston-MCI" is a Policy Routing rule.

Figure 3:
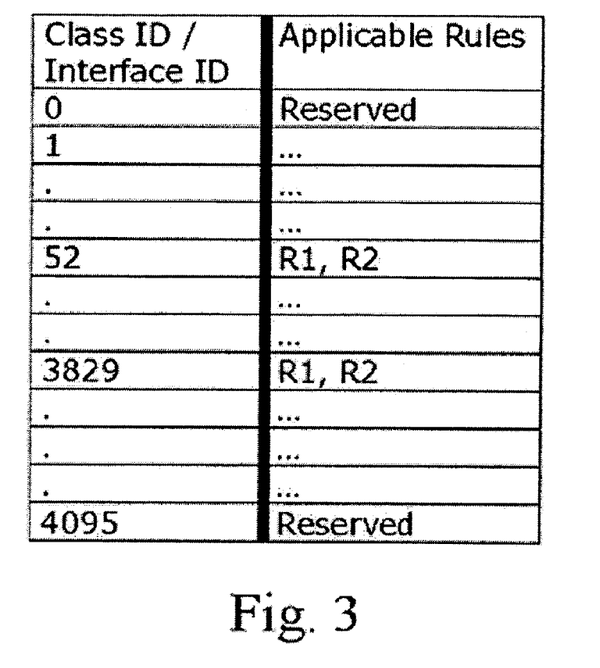
FIG. 3 depicts a portion of an example hardware lookup table showing the relationship between Class ID and packet forwarding rules, in accordance with an embodiment of the invention.

When the network node receives the class configuration command 202, the network node will store the Class ID 52 in a hardware lookup table in association with data representative of the two aforementioned packet forwarding rules. A portion of an example hardware lookup table showing the relationship between Class ID and packet forwarding rules is shown in FIG. 3. In one embodiment, the hardware lookup table is implemented by a Content Addressable Memory (CAM).

In one embodiment, Class IDs are 12-bit in length and may range from 0 to 4095. Class ID "0" may be used as a Default Class ID. In one embodiment, a maximum number of interface classes is specified, for instance, by the interface class maximum command 212 of FIG. 2. When a maximum number of interface classes is specified, the Class IDs will range from 0 to the maximum specified value. In that embodiment, the values outside of the Class ID range (from the maximum Class ID value plus one to 4095) can be used as Interface IDs. The Interface IDs are generally used to identify L3 interfaces that require hardware support but do not belong to any specific interface classes.

With reference again to FIG. 2, every interface that belongs to the Interface Class 52 inherits all the attributes, including the packet forwarding rules, of the Interface Class. An interface belongs to an Interface Class when it is explicitly configured to belong to that Interface Class. An example of an interface configuration command that explicitly associates an interface with a configured Interface Class is the command 204. As shown, the interface configuration command 204 configures a physical interface (2/1/0) with the Class ID 52, an IP address of 165.122.128.12, and a subnet mask of 255.255.0.0 to create an L3 interface that belongs to the Interface Class 52. The L3 interface thus created would inherit all the attributes of the Interface Class 52, including the packet forwarding rules that are applicable to the Interface Class.

Multiple interfaces can belong to an Interface Class. For instance, the interface configuration command 206 configures another physical interface (1/0/1) with the Class ID 52, an IP address of 192.16.5.29, and a subnet mask of 255.255.255.0 to create an L3 interface that, like the L3 interface above, belongs to the Interface Class 52. This L3 interface will also inherit all the attributes of the Interface Class 52, including the packet forwarding rules that are applicable to the Interface Class. A result is the aggregation of the use of a 12-bit identifier to refer to multiple interfaces.

In one embodiment, an interface that is not explicitly configured to belong to an Interface Class is implicitly configured to belong to a Default Interface Class, which has a Class ID of "0." When an interface is implicitly configured to belong to a Default Interface Class, the network node will generate an Interface ID and assign the Interface ID to the interface. In one embodiment, the generated Interface ID will have a value greater than the maximum Class ID but smaller than 4096 such that it can be stored in the hardware lookup table of FIG. 3. For example, interface configuration command 210 configures a physical interface (2/1/3) with the IP address of 192.15.4.22, and the subnet mask 255.255.0.0 to create yet another L3 interface. The command 210 also specifies two packet forwarding rules for the L3 interface. This L3 interface thus created will be assigned an Interface ID (e.g., 3829), which will also be stored in a hardware lookup table such as the one shown in FIG. 3 in association with data representative of the specified packet forwarding rules.

Attention now turns to the relationship between VLAN IDs and Class IDs and Interface IDs. By way of background, VLAN is an acronym for Virtual Local Area Network. A VLAN is an emulation of a standard LAN and can also be considered a broadcast domain set up within a switch. VLANs allow a group of devices to communicate as if they are attached to the same LAN segment even though the devices are actually located on different LAN segments. With VLANs, switch/routers can support more than one subnet on a physical link.

According to an embodiment of the invention, the network node 100 is configured to support the following types of L3 interfaces:
1. L3 interfaces that are mapped to a VLAN, and
2. L3 interfaces that are mapped to a single port.

In this embodiment, the network node treats the L3 interfaces that are mapped to a single port as if they are mapped to a VLAN with a single port. Thus, every L3 interface is assigned a VLAN ID, regardless of whether it maps to an actual VLAN. If an L3 interface is mapped to a VLAN, the L3 interface will be assigned a VLAN ID that is between 2 and 4094, inclusive. If an L3 interface is mapped to a single port, the L3 interface will be assigned a VLAN ID that is larger than 4095. Note that a VLAN ID that is larger than 4095 is consistent with the IEEE 802.1Q standard. A port that is not explicitly associated with a VLAN ID gets associated with a VLAN ID that is greater than 4095. This port cannot be configured to carry 802.1Q encapsulated traffic. Hence the VLAN ID is not of any significance. In other words, traffic entering or leaving such a port would not have the VLAN ID in the packet header.

Figure 4:
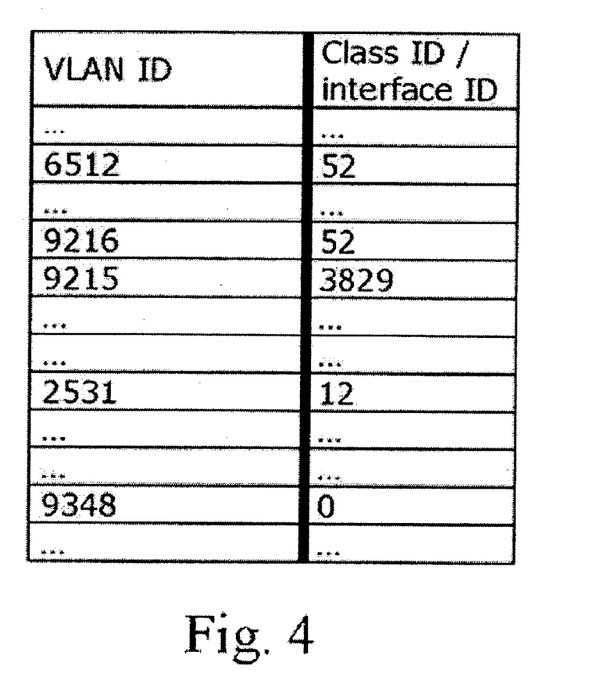
FIG. 4 depicts a portion of a lookup table where VLAN IDs of the L3 Interfaces can be used as keys to look up the corresponding Class IDs and Interface IDs, in accordance with an embodiment of the invention.

Referring now to FIG. 4, there is shown a portion of a lookup table where VLAN IDs of the L3 Interfaces can be used as keys to look up the corresponding Class IDs and Interface IDs. The lookup table of FIG. 4 is sometimes referred to as an L2 lookup table. In one embodiment, the Class IDs/Interface IDs of this lookup table are programmed by the interface configuration commands such as those shown in FIG. 2. L3 interfaces have Class IDs if they belong to an Interface Class. L3 interfaces that do not belong to any Interface Class have unique Interface IDs. If an L3 interface that does not need hardware support for packets sent or received, the interface will have an Interface ID of "0." Examples of L3 interfaces that typically do not need hardware support for packets sent or received include L3 interfaces that are mapped to MPLS tunnels, PIM Register Tunnels, or GRE Tunnels.

Note that, as shown in FIG. 4, the same Class ID may be shared by multiple L3 interfaces belonging to the same Interface Class. The use of Interface Classes enables the same set of packet forwarding rules to be associated with different interfaces while consuming only a single interface ID value from the limited ID space. As a result, even if the number of Class IDs and Interface IDs is limited, the network node can support a significantly larger number of logical interfaces.

Figure 6A:
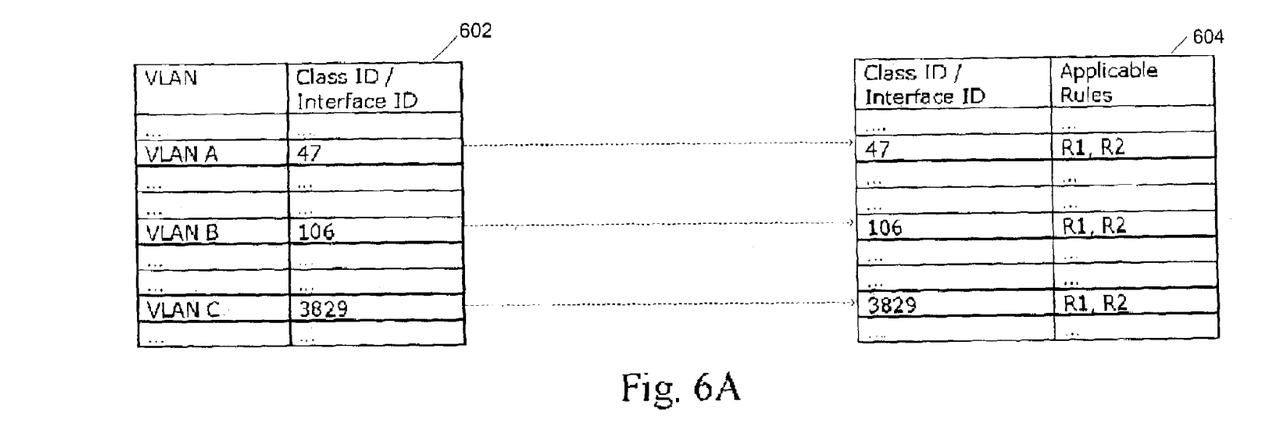
FIG. 6A depicts the limitation on the number of supported interfaces.

Associating the same interface class with multiple interfaces has an aggregation effect that expands the number of interfaces that can be accommodated in a cascaded lookup. FIG. 6A depicts the limitation on the number of interfaces that a network node can accommodate without using Interface Classes. In FIG. 6A, lookup table 602 stores VLAN IDs and Interface IDs, and lookup table 604 stores Interface IDs and the associated packet forwarding rules. VLAN A is associated with an Interface ID of 47, which maps to an entry of lookup table 604 that contains the rules R1 and R2. VLAN B is associated with an Interface ID of 106, which maps to an entry of the lookup table 604 that also contains the rules R1 and R2. VLAN C is associated with an Interface ID of 3829, which maps to an entry of the lookup table 604 that also contains the same rules R1 and R2. In this example, there is no aggregation effect, and the number of interfaces that can be accommodated is limited by the number of entries of the table 604.

Figure 6B:
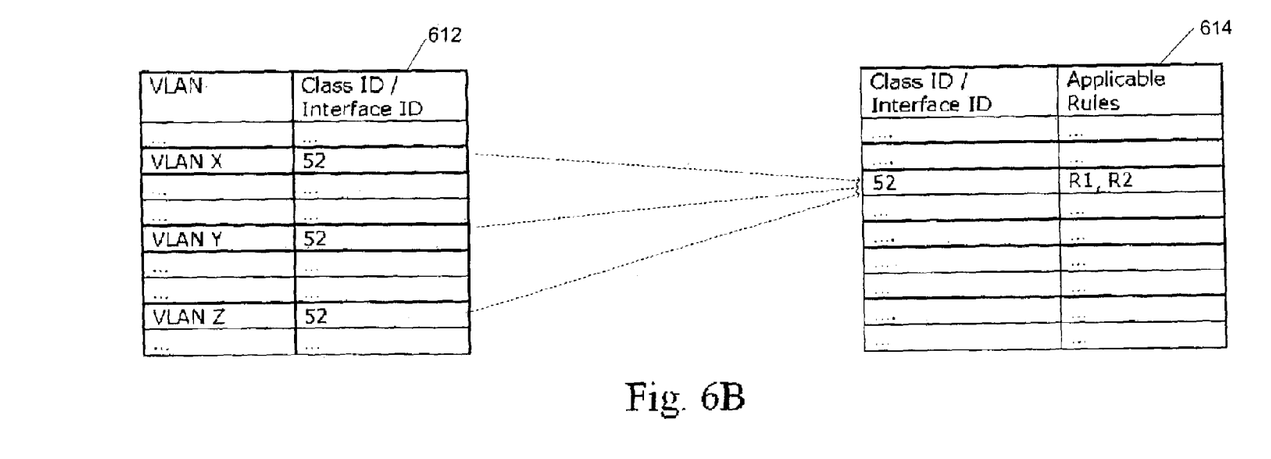
FIG. 6B depicts the aggregation effect brought about by the use of Interface Classes according to an embodiment of the invention.

FIG. 6B depicts how the number of interfaces that a network node can accommodate is expanded when Interface Classes are used. In FIG. 6B, lookup table 612 stores VLAN IDs and Class IDs and Interface IDs; and, lookup table 614 that stores Class IDs and Interface IDs and their associated packet forward rules. In FIG. 6B, VLAN X, Y and Z are associated with a Class ID of 52, which maps to a single entry of the lookup table 614 that contains data representative of the packet forwarding rules R1 and R2. In this example, the use of Interface Classes allows a much larger range for the table 612 without expanding the size of table 614.

Figure 5:
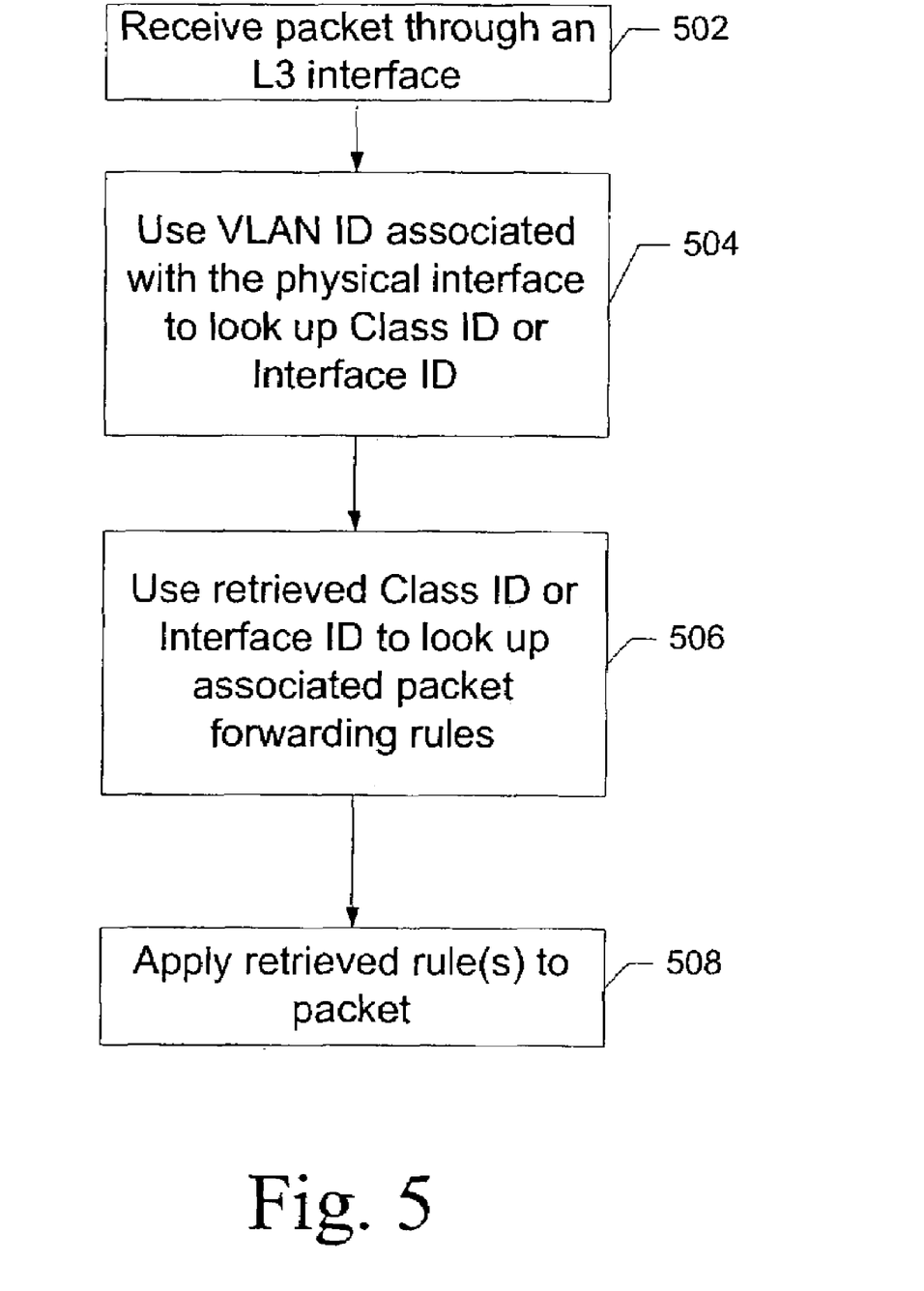
FIG. 5 depicts a flow diagram for an L3 switching process performed by a packet forwarding mechanism according to an embodiment of the invention.

FIG. 5 is a flow diagram for an L3 switching process in accordance with an embodiment of the invention. The L3 switching process shown can be performed by a packet forwarding mechanism, such as specialized hardware on the line cards 102a-102c and/or processors 118.

As shown, at step 502, a packet is received through an L3 interface. At step 504, the network node uses the VLAN ID associated with the physical interface to obtain a Class ID or an Interface ID of the L3 interface. As discussed above, if the L3 interface belongs to a configured Interface Class, a Class ID can be obtained by looking up a table such as the one shown in FIG. 4. If the L3 interface does not belong to a configured Interface Class, an Interface ID can be obtained by looking up the same table.

At step 506, the network node uses the obtained Class ID or Interface ID to retrieve applicable packet forwarding rules. In one embodiment, step 506 can be performed by looking up a hardware lookup table, such as the one shown in FIG. 3.

At step 508, the network node applies the retrieved rules to the packet.

Preferred embodiments and best mode of the invention have thus been disclosed. Although specific embodiments of the invention have been described and illustrated, the invention is not to be limited to the specific forms or arrangements of parts as described and illustrated herein. The invention is limited only by the claims.

What is claimed is:

1. A network node having a plurality of communication ports, the network node comprising:
   an interface configuration mechanism operable to receive user commands, the user commands comprising:
      an interface class configuration command that configures at least in part a Layer 3 (L3) interface class in terms of an L3 interface class identifier and one or more packet forwarding rules;
      a first interface configuration command that configures at least in part a first L3 interface for a specified one of the plurality of communication ports and non-exclusively assigns the L3 interface class identifier to the first L3 interface;
      a second interface configuration command that configures at least in part a second L3 interface for a specified one of the plurality of communication ports and non-exclusively assigns the L3 interface class identifier to the second L3 interface;
      wherein the first and second L3 interfaces specify a port identifier, a media type, an IP address, and an IP subnet mask;
   a packet forwarding mechanism operable to apply the one or more packet forwarding rules, which are associated with the L3 interface class identifier, to packets arriving at the first and second L3 interfaces, the packet forwarding mechanism comprising a first hardware lookup table having a plurality of entries, some of said entries corresponding to interface class configuration commands and being identified by L3 interface class identifiers (IDs) and other of said entries corresponding to interface configuration commands and being identified by L3 interface IDs, wherein said entries in the first hardware lookup table include the respective L3 interface class IDs and L3 interface IDs and data representative of their respective packet forwarding rules; and
   a second hardware lookup table having a plurality of entries, each entry corresponding to an interface configuration command and operable to store an L3 interface class identifier in association with at least a VLAN ID.

2. The network node of claim 1, wherein the packet forwarding mechanism is operable to apply the one or more packet forwarding rules to packets arriving at the first L3 interface and packets arriving at the second L3 interface.

3. The network node of claim 1, wherein the interface configuration mechanism comprises a Command Line Interface (CLI).

4. The network node of claim 1, wherein the user commands further comprise a third interface configuration command that configures at least in part a third L3 interface for a third specified one of the communication ports in terms of at least one or more packet forwarding rules, wherein the third L3 interface specifies a port identifier, a media type, an IP address, and an IP subnet mask.

5. The network node of claim 4, wherein the interface configuration mechanism generates an L3 interface identifier for the third L3 interface when the interface configuration command does not specify an L3 interface class identifier.

6. A method for managing a network node, comprising:
   identifying Layer 3 (L3) interface classes;
   associating one or more packet forwarding rules with each one of the L3 interface classes;
   assigning L3 interface class identifiers (IDs) to the L3 interface classes;
   establishing L3 interfaces in terms of a port identifier, a media type, an IP address, an IP subnet mask;
   associating one or more packet forwarding rules with each one of the L3 interfaces;
   assigning L3 interface IDs to the L3 interfaces;
   storing the L3 interface class IDs and the L3 interface IDs in the same hardware lookup table in association with data representative of their respective packet forwarding rules;
   using the hardware lookup table to retrieve packet forwarding rules based on an L3 interface class ID or based on an L3 interface ID;
   establishing at least two L3 interfaces in terms of a port identifier, a media type, an IP address, an IP subnet mask, and a first L3 interface class of the L3 interface classes;
   receiving a first packet via a first one of the at least two L3 interfaces;
   applying the one or more packet forwarding rules, which are associated with the first L3 interface class, to the first packet;
   receiving a second packet via a second one of the at least two L3 interfaces; and
   applying the one or more packet forwarding rules, which are associated with the first L3 interface class, to the second packet;
   wherein the maximum number of IDs supported in the hardware lookup table is fixed to a limited ID space and wherein a maximum number of L3 interface classes is specified as a subset of the limited ID space such that IDs from the limited ID space are assigned to L3 interface classes up to the maximum number of L3 interface classes and IDs from the limited ID space outside the maximum number of L3 interfaces classes are assigned to L3 interfaces.

7. The method of claim 6, wherein the identifying step comprises limiting a maximum number of class identifiers to a predetermined value.

8. The method of claim 6, wherein the one or more packet forwarding rules comprise a rule for establishing an access control list (ACL).

9. The method of claim 6, wherein the one or more packet forwarding rules comprise a rule for establishing Quality of Service (QoS) guarantees.

10. The method of claim 6, wherein the one or more packet forwarding rules comprise a rule for establishing policy routing.

11. The method of claim 6, wherein the establishing step comprises providing the class identifier, an IP address, and a subnet mask for a selected physical port of the network node to define a first Layer 3 Interface.

12. The method of claim 11, wherein the establishing step comprises providing the class identifier, an IP address, and a subnet mask for a selected physical port of the network node to define a second Layer 3 Interface.

13. The method of claim 6, wherein the identifying step comprises assigning a class identifier to the L3 interface class and further comprising:

receiving a first packet via a first one of the at least two L3 interfaces;

performing a hardware lookup using the class identifier as a key to identify the one or more packet forwarding rules;

applying the one or more packet forwarding rules, which are identified through the hardware lookup, to the first packet;

receiving a second packet via a second one of the at least two L3 interfaces;

performing a hardware lookup using the class identifier as a key to identify the one or more packet forwarding rules;

applying the one or more packet forwarding rules, which are identified through the hardware lookup, to the second packet.

14. The network node of claim 1 wherein the maximum number of IDs supported in the first hardware lookup table is fixed to a limited ID space and wherein a maximum number of L3 interface classes is specified as a subset of the limited ID space such that IDs from the limited ID space are assigned to L3 interface classes up to the maximum number of L3 interface classes and IDs from the limited ID space outside the maximum number of L3 interfaces classes are assigned to L3 interfaces.

* * * * *